US008939648B2

(12) United States Patent
Schneider et al.

(10) Patent No.: US 8,939,648 B2
(45) Date of Patent: Jan. 27, 2015

(54) SOLAR TRACKING BEARING AND SOLAR TRACKING SYSTEM EMPLOYING SAME

(75) Inventors: Matthew Schneider, Los Angeles, CA (US); Jean-Paul Labrosse, Altadena, CA (US); Jeffrey Lamb, San Gabriel, CA (US)

(73) Assignee: First Solar, Inc., Perrysburg, OH (US)

( * ) Notice: Subject to any disclaimer, the term of this patent is extended or adjusted under 35 U.S.C. 154(b) by 0 days.

(21) Appl. No.: 13/572,138

(22) Filed: Aug. 10, 2012

(65) Prior Publication Data

US 2013/0039610 A1 Feb. 14, 2013

Related U.S. Application Data

(60) Provisional application No. 61/522,734, filed on Aug. 12, 2011.

(51) Int. Cl.
*F16C 35/00* (2006.01)
*F24J 2/54* (2006.01)

(52) U.S. Cl.
CPC .......... *F24J 2/541* (2013.01); *F24J 2002/5451* (2013.01); *F24J 2002/5468* (2013.01); *F24J 2002/5482* (2013.01); *Y02E 10/47* (2013.01)
USPC ............................ 384/428; 384/440; 384/444

(58) Field of Classification Search
USPC ......... 384/129, 154, 275, 276, 291, 295–300, 384/416–419, 428, 432, 438–444
See application file for complete search history.

(56) References Cited

U.S. PATENT DOCUMENTS

| 2,115,579 | A | * | 4/1938 | Hannaford | 384/434 |
| 3,820,860 | A | * | 6/1974 | Stone | 384/428 |
| 4,384,643 | A | * | 5/1983 | Cone | 384/443 |
| 4,603,982 | A | * | 8/1986 | Dittrich | 384/129 |
| 4,815,585 | A | * | 3/1989 | May | 384/434 |
| 6,058,930 | A | | 5/2000 | Shingleton | |
| 7,531,741 | B1 | | 5/2009 | Melton et al. | |
| 7,836,879 | B2 | | 11/2010 | Mackamul | |
| 7,989,746 | B2 | | 8/2011 | Chen et al. | |
| 2008/0230047 | A1 | | 9/2008 | Shugar et al. | |
| 2011/0041834 | A1 | | 2/2011 | Liao | |
| 2011/0186040 | A1 | | 8/2011 | Liao | |
| 2011/0240006 | A1 | | 10/2011 | Linke et al. | |
| 2011/0253195 | A1 | | 10/2011 | Kim | |

FOREIGN PATENT DOCUMENTS

| CA | 2 761 089 A1 | 11/2010 |
| EP | 2 317 247 A2 | 5/2011 |
| KR | 10-0864215 B1 | 10/2008 |
| KR | 10-2009-0108261 A | 10/2009 |
| KR | 10-0997883 B1 | 12/2010 |

* cited by examiner

*Primary Examiner* — James Pilkington
(74) *Attorney, Agent, or Firm* — Dickstein Shapiro LLP

(57) ABSTRACT

An solar tracker bearing comprising a pair of stationary outer bearing races attached on either side of a bearing support element and a rotatable inner bearing race held by the pair of outer bearing races, the rotatable inner bearing race having an beam slot for seating a torque tube beam therein.

39 Claims, 11 Drawing Sheets

US 8,939,648 B2

SOLAR TRACKING BEARING AND SOLAR TRACKING SYSTEM EMPLOYING SAME

CROSS-REFERENCE

This application claims priority to Provisional U.S. Patent Application No. 61/522,734, filed on Aug. 12, 2011, the disclosure of which is incorporated by reference in its entirety.

FIELD OF THE INVENTION

Embodiments of the invention relate generally to photovoltaic systems, and more specifically to solar tracking systems.

BACKGROUND OF THE INVENTION

Photovoltaic power generation systems convert solar radiation to electrical current using photovoltaic modules. To provide increased (and more consistent) energy generation over the course of a day, power generation systems can employ solar trackers that change the inclination of the photovoltaic modules to maintain a fixed angle of incidence between the Sun and the photovoltaic modules.

Generally, solar trackers require very high mechanical system reliability and low part and installation costs to enable deployment in utility scale photovoltaic power generation systems. Within solar trackers, bearing designs have traditionally been particularly high in cost due to material usage, required part counts, and complexity of manufacturing. In addition, assembly of such bearings generally requires field welding or beam-to-beam bolting. This requires the presence of skilled workers in remote locations, causes safety concerns, and creates bottlenecks around construction equipment.

An improved solar tracking bearing and solar tracker employing it, which is more easily deployed in the field, would be desirable.

DETAILED DESCRIPTION OF THE INVENTION

In the following detailed description, reference is made to the accompanying drawings which form a part hereof, and which illustrate specific embodiments of the invention. These embodiments are described in sufficient detail to enable those of ordinary skill in the art to make and use them. It is also understood that structural, logical, or procedural changes may be made to the specific embodiments disclosed herein without departing from the spirit or scope of the invention.

Figure 1A:
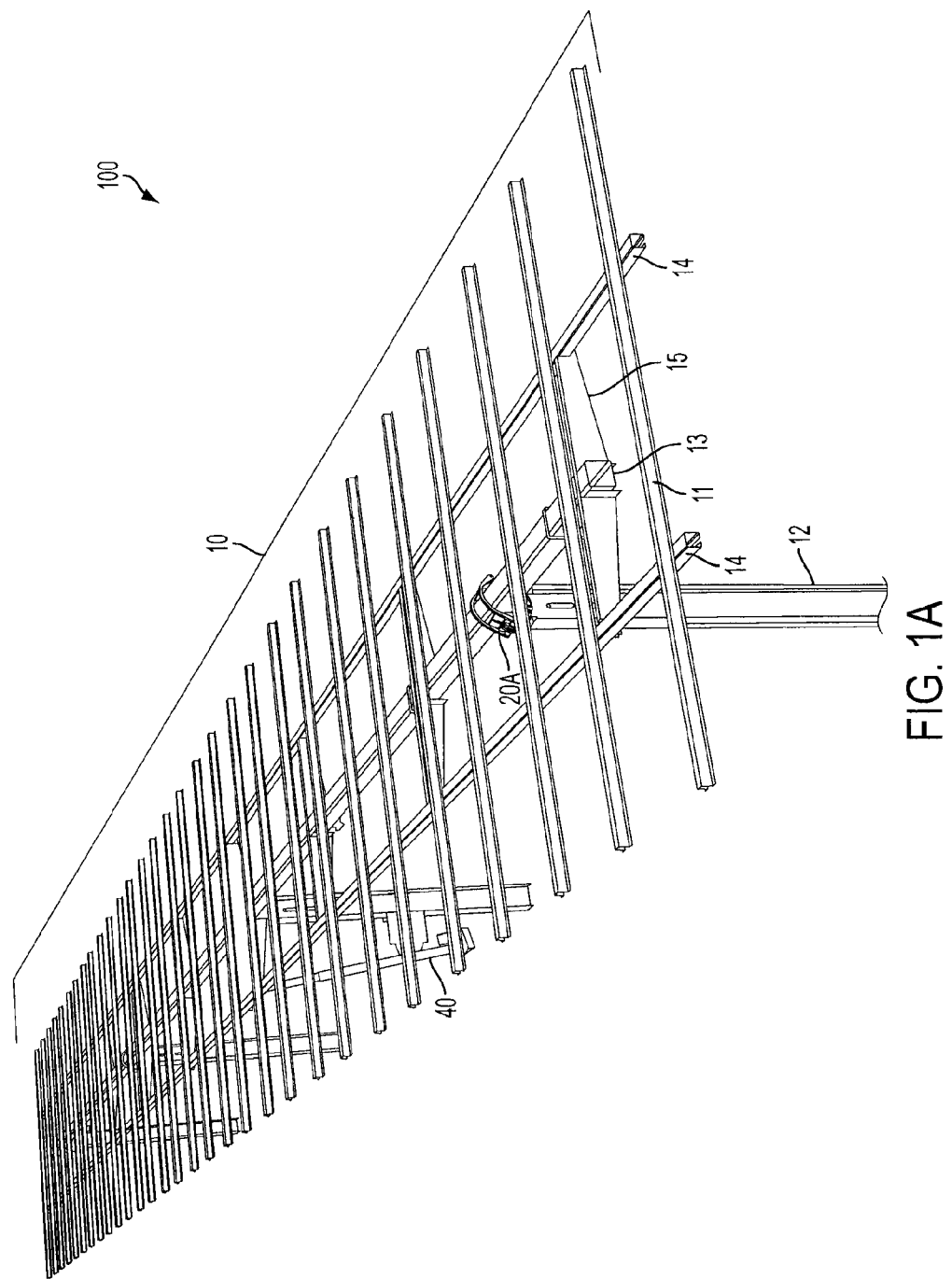
FIGS. 1A-1B are respective perspective and side views of a photovoltaic array equipped with an electromechanical solar tracker, according to an exemplary embodiment.
Figure 1B:
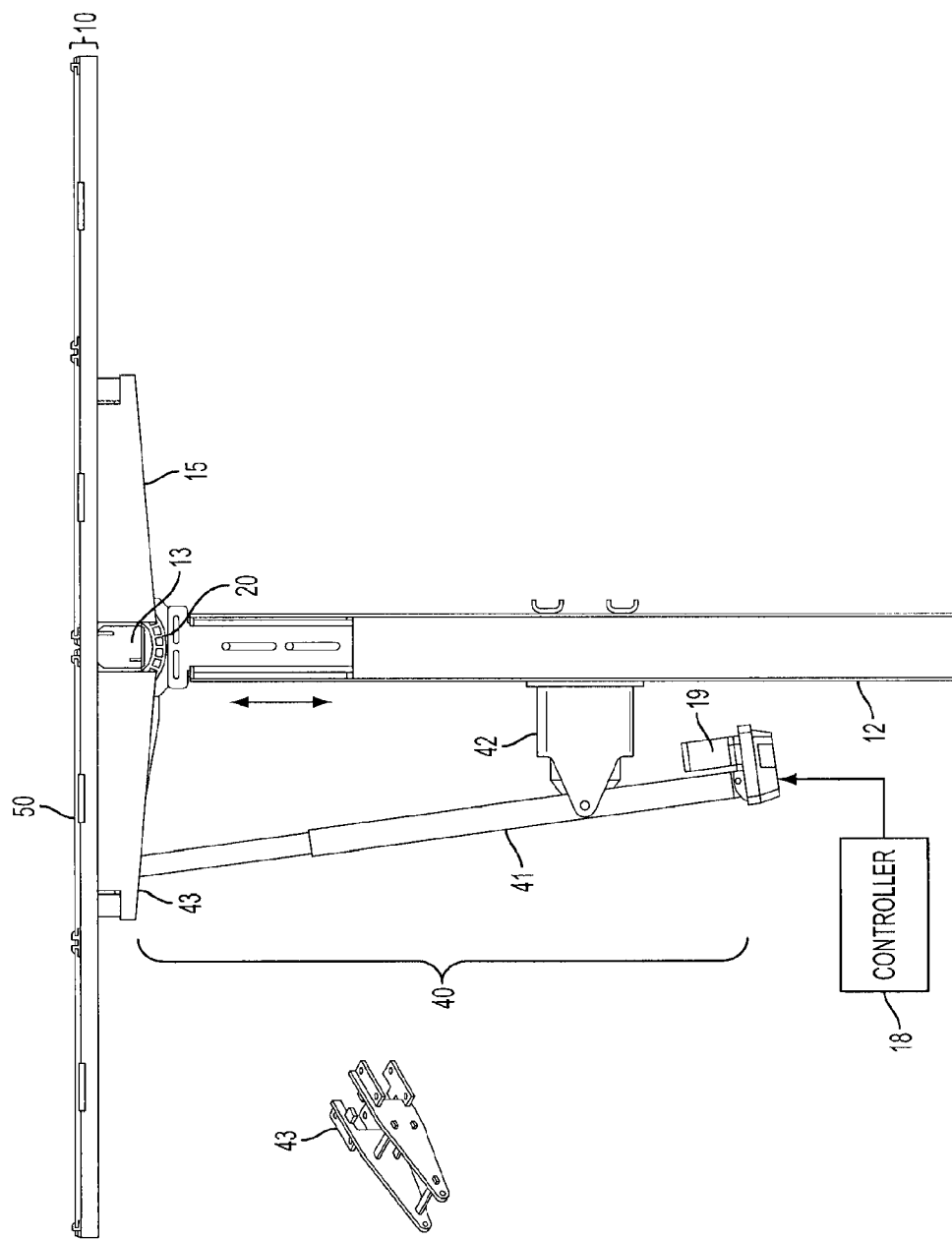

FIGS. 1A and 1B illustrate a solar tracking system 100, which can be used to support a plurality of photovoltaic modules 50. The system 100 comprises a frame 10 of transversely arranged elongated members 11 mounted atop a pair of longitudinally arranged elongated members 14. One or more photovoltaic panels 50 can be mounted on the transversely arranged elongated members 11 and secured thereto by clips. The longitudinally arranged elongated members 14 are mounted on respective ends of one or more saddle brackets 15, which are secured atop a torque tube beam 13 at the center of the rotating frame 10. Torque tube beam 13, which can be square, round, or other shape, is seated in one or more solar tracker bearings 20A that are mounted atop respective support posts 12. Attached to one of the support posts 12 is an electromechanical actuator 40 that is controlled by a controller 18 and used to adjust the inclination angle of frame 10. As can be seen in more detail in FIG. 1B, electromechanical actuator 40 comprises a drive screw 41 secured to support post 12 through an attachment bracket 42 and to frame 10 by a lever arm 43, which is secured to torque tube beam 13. Extension or retraction of the drive screw 41 causes lever arm 43 to rotate torque tube beam 13 in the bearings 20A, changing the inclination angle of frame 10. The drive screw 41 may be moveable by an electric motor 19, hydraulics, or other motorized power source under control of controller 18.

Figure 2A:
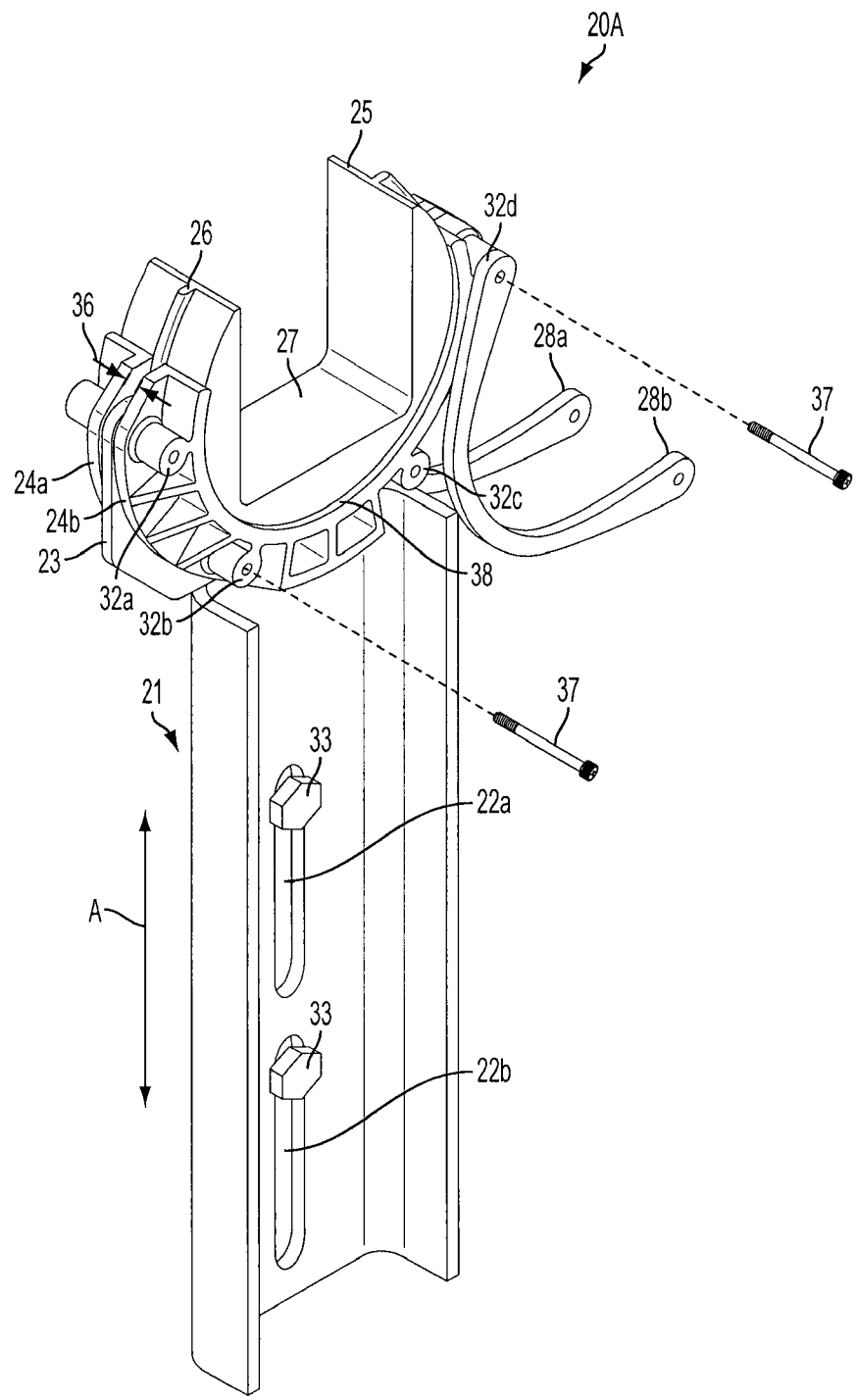
FIGS. 2A and 2B are perspective side of a solar tracker bearing, according to an exemplary embodiment, showing open and closed states.
Figure 2B:
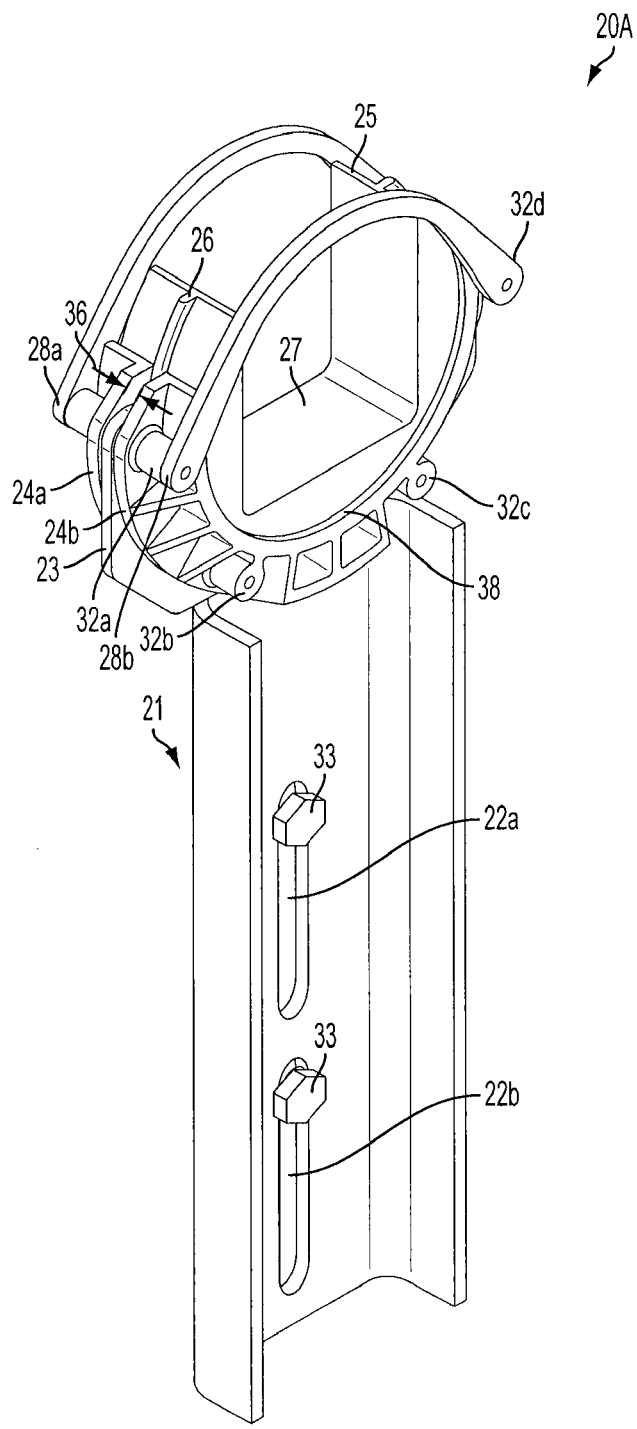

FIGS. 2A and 2B show a first embodiment of a solar tracker bearing, 20A. Bearing 20A comprises a bearing securing element 21 which mounts bearing 20A to a support post 12 (as better shown in FIG. 1B). Bearing securing element 21 comprises a pair of Z-axis (height) adjustable mounting slots 22a and 22b, through which bolts, screws, or other attachment means 33 may pass to mount bearing securing element 21 to support post 12. In this manner, the Z-axis position (height) of the entire bearing 20A can be easily adjusted along the direction of arrow A.

Atop bearing securing element 21 is a rigid U-shaped bearing support element 23 to which a pair of stationary U-shaped outer bearing races 24a and 24b are mounted, one on either side, through one or more mounting holes 32a-d extending through outer bearing races 24a and 24b and bearing support element 23, by bolts, screws or other attachment means 37. The mounting holes may be arranged so that the mounting of each outer bearing race 24a and 24b employs separate mounting holes 32a-d and can be mounted to bearing securing element 21 individually (and thus, uninstalled individually). The arrangement of the outer bearing races 24a and 24b is such that a bearing surface 38 is raised above a topmost portion of bearing support element 23, forming a groove 36 between the outer bearing races 24a and 24b.

Bearing securing element 21 and bearing support element 23 are preferably galvanized steel, but can be any suitable material with similar properties. Outer bearing races 24a and 24b are generally formed of a low friction material, e.g., a metal, polymer or bi-material metal-polymer hybrid, some examples being polyether ether ketone (PEEK), high-modulus polyethylene (HMPE), and polyoxymethylene (POM), and provide a primary rotation point for bearing 20A.

In this first embodiment, bearing securing element 21 and bearing support element 23 are integrated as a single structural element, in this case a single piece of galvanized steel. Bearing securing element 21 and bearing support element 23 may be separate structures, or, in another embodiment, completely integrated with support post 12. It is also understood that U-shaped outer bearing races 24a and 24b may be integrated as a single structural element (such as 24C shown in FIG. 6), that is, a single outer bearing race may be used. Such a single outer bearing race could be formed to fit over bearing support element 23 with, or without a groove 36.

A rotatable inner bearing race 25 is positioned atop bearing surface 38 over the outer bearing races 24a and 24b. Inner bearing race 25 is held in place laterally by tongue 26, which is positioned in groove 36, thus preventing inner bearing race 25 from being displaced laterally from the bearing 20A. Inner bearing race 25 is also prevented from being lifted out of bearing 20A because the arcs of outer bearing races 24a and 24b extend beyond 180 degrees, thus securely holding inner bearing race 25 between them without additional parts.

Figure 4:
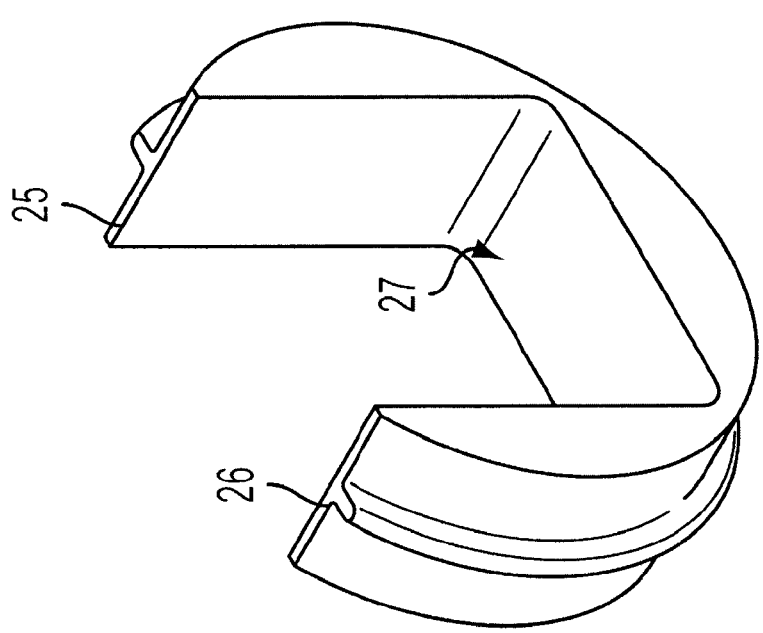
FIG. 4 is a perspective view of an inner bearing race usable in the FIGS. 2A-2B and 3A-3B embodiments.
Figure 5:
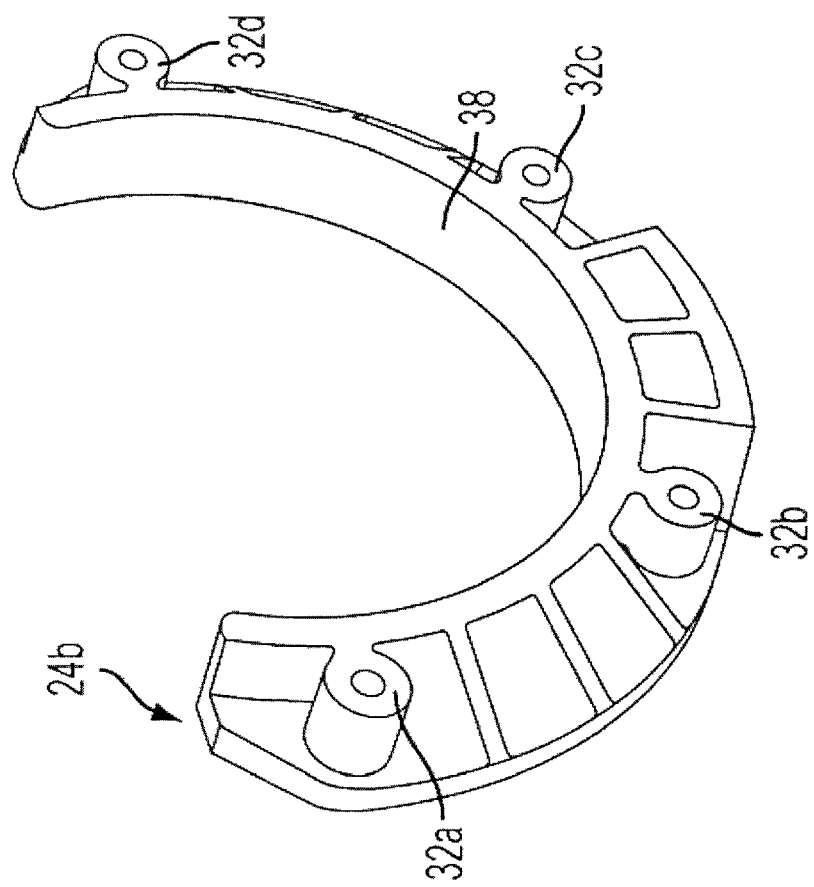
FIG. 5 is a perspective view of an outer bearing race usable in the FIGS. 2A-2B and 3A-3B embodiments.

The inner bearing race 25 provides an open beam slot 27 in which a torque tube beam 13 can be seated. Inner bearing race 25 is shown by itself in FIG. 4 for clarity, while an outer bearing race 24b is shown by itself in FIG. 5. Beam slot 27, shown having a square U-shape, can be configured in any shape, which matches a cross-section of torque tube beam 13. The open beam slot 27 provides for lateral movement tolerances by holding the torque tube beam 13 for rotation without being connected to it, and permits torque tube beam 13 to be simply lowered into the inner bearing race 25 of bearing 20A, e.g., by a forklift or other lifting and lowering method. Inner bearing race 25 is preferably stainless steel, but can be any other material that is suitable for holding the torque tube beam 13.

The torque tube beam 13 is held in place on inner bearing race 25 by gravity. In addition, optional capture straps 28a and 28b can also be used to open and close the top of the bearing 20A after the torque tube beam 13 is installed to help hold torque tube beam 13 in place on the bearing 20A. Two capture straps 28a and 28b are shown, however, it is understood that a single capture strap 28a may be employed. The capture straps 28a and 28b are preferably galvanized steel, but can be any suitable material with similar properties. It can be appreciated that the end of capture straps 28a and 28b can have holes which align with the mounting holes 32a and 32d on outer bearing races 24a and 24b, to permit securing them with either the same or separate bolts, screw or other attachment means that secure outer bearing races 24a and 24b to the bearing support element 23.

Figure 4A:
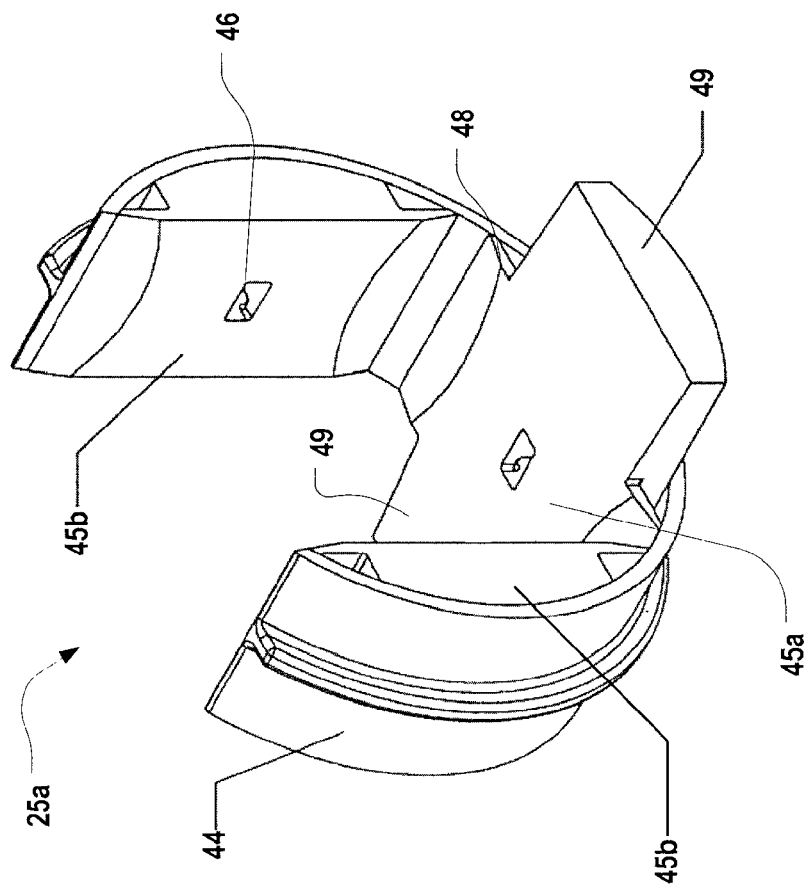
FIG. 4A is a perspective view of an inner bearing race according to a second exemplary embodiment.
Figure 4C:
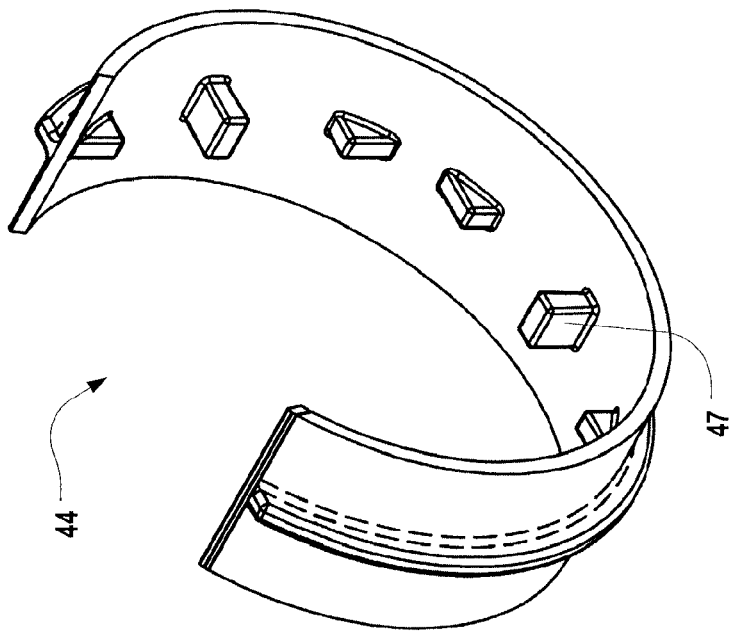
FIG. 4C is a perspective view of an inner bearing race housing according to a disclosed embodiment.
Figure 4B:
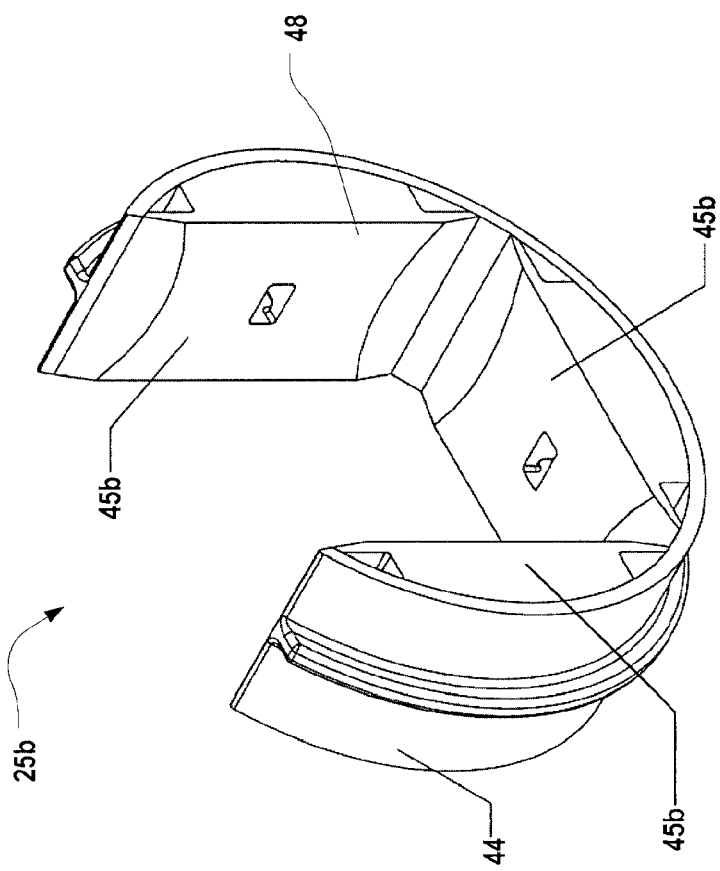
FIG. 4B is a perspective view of an inner bearing race according to a third exemplary embodiment.

In other embodiments, the inner bearing race 25a,b may be formed from multiple components as shown in FIGS. 4A and 4B. To reduce cost compared to the inner bearing race 25 and simplify assembly, the inner bearing race 25a is formed of an inner bearing race housing 44 and tube supports 45a,b as shown in FIG. 4A. In one embodiment, the inner bearing race housing 44 may be stainless steel, aluminum, a high-strength polymer, or a similar material. The tube supports 45a,b (shown in detail in FIGS. 4D and 4E) are fastened to the inner bearing race housing 44 (shown in detail in FIG. 4C). In one embodiment, the tube supports 45a,b may be formed from a molded polymer with molded clips 46 that fasten to attachment points 47 (shown in FIG. 4C) on the inner bearing race housing 44. In one embodiment, the tube supports 45a,b are formed from a glass-reinforced polymer. In another embodiment, the tube supports 45a,b are formed with an arcuate surface 48. The arcuate surface 48 enables the torque tube assembly 13 to be placed in the inner bearing race 25a,b with a rotational tolerance such that the torque tube assembly 13 may be rotated even if the sides of the torque tube assembly 13 are not completely square to the arcuate surface 48 of the tube supports 45a,b.

Figure 4E:
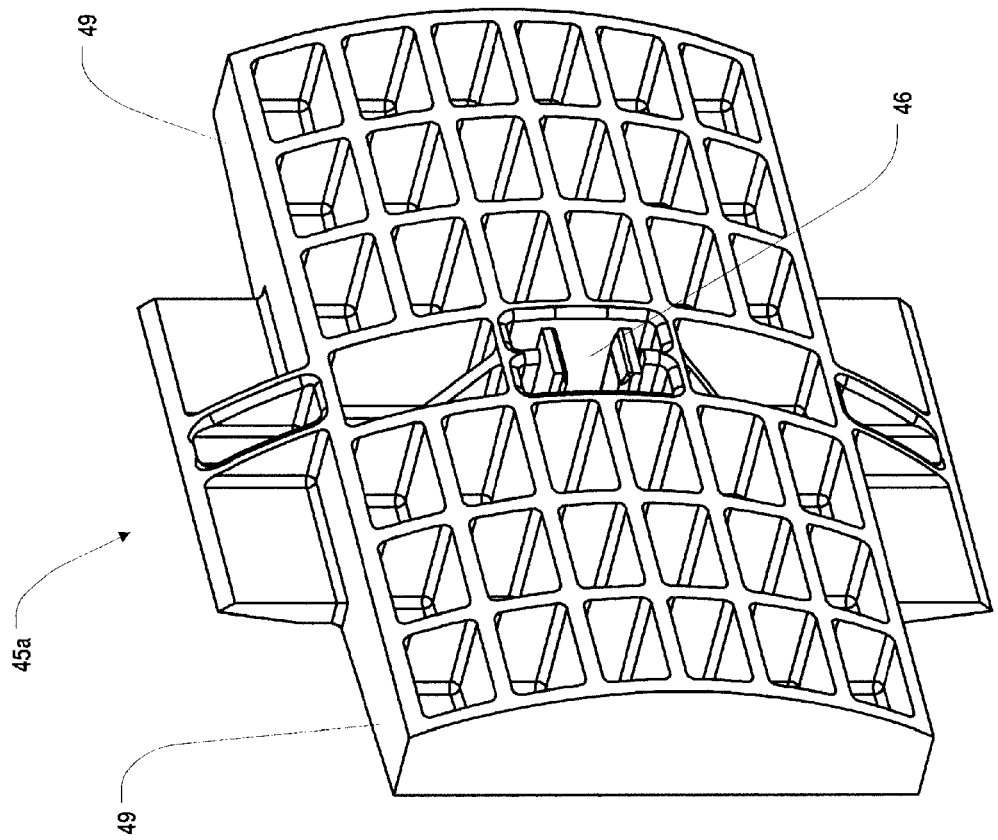
FIG. 4E is a bottom perspective view of a tube support according to a second disclosed embodiment.
Figure 4D:
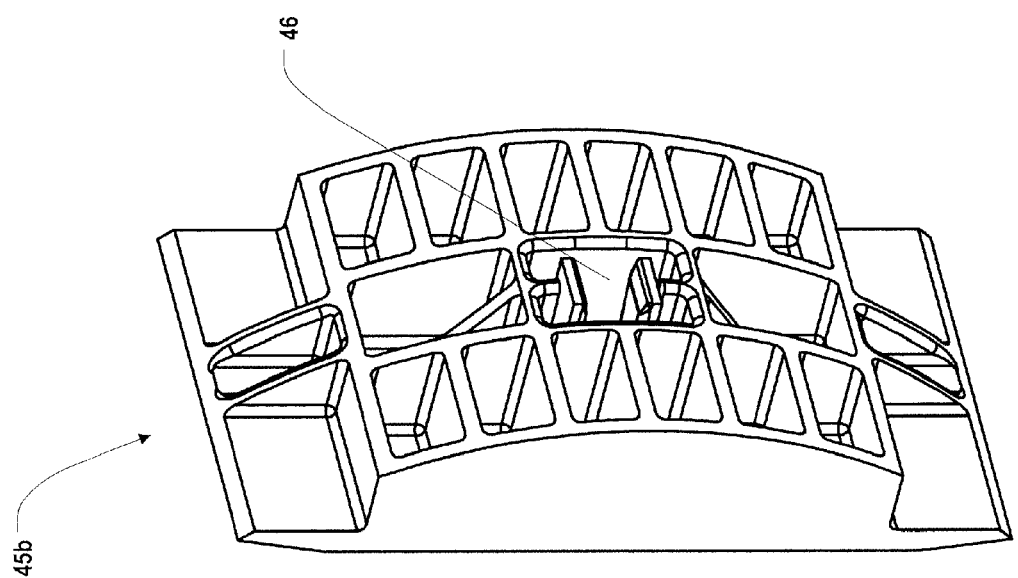
FIG. 4D is a bottom perspective view of a tube support according to a disclosed embodiment.

In one embodiment, the tube support 45a is provided with tabs 49 as shown in FIGS. 4A and 4E. The tabs 49 aid in preventing the lever arm 43 (shown in FIG. 1B) from sliding relative to the inner bearing race 25a in the event of a seismic event such as an earthquake. The inner bearing race 25a provided with the tabs 49 could be provided in the lever arm 43 (shown in FIG. 1B). The tabs 49 would then extend from one inner surface of the lever arm 43 to the opposing inner surface, acting as spacers. In addition, the tabs 49 also serve to provide additional support to the torque tube beam 13 such that adjacent support posts 12 can be spaced a greater distance apart. In another embodiment, shown in FIG. 4B, only tube supports 45b may be used in the inner bearing race 25b instead of tube support 45a.

Figure 3A:
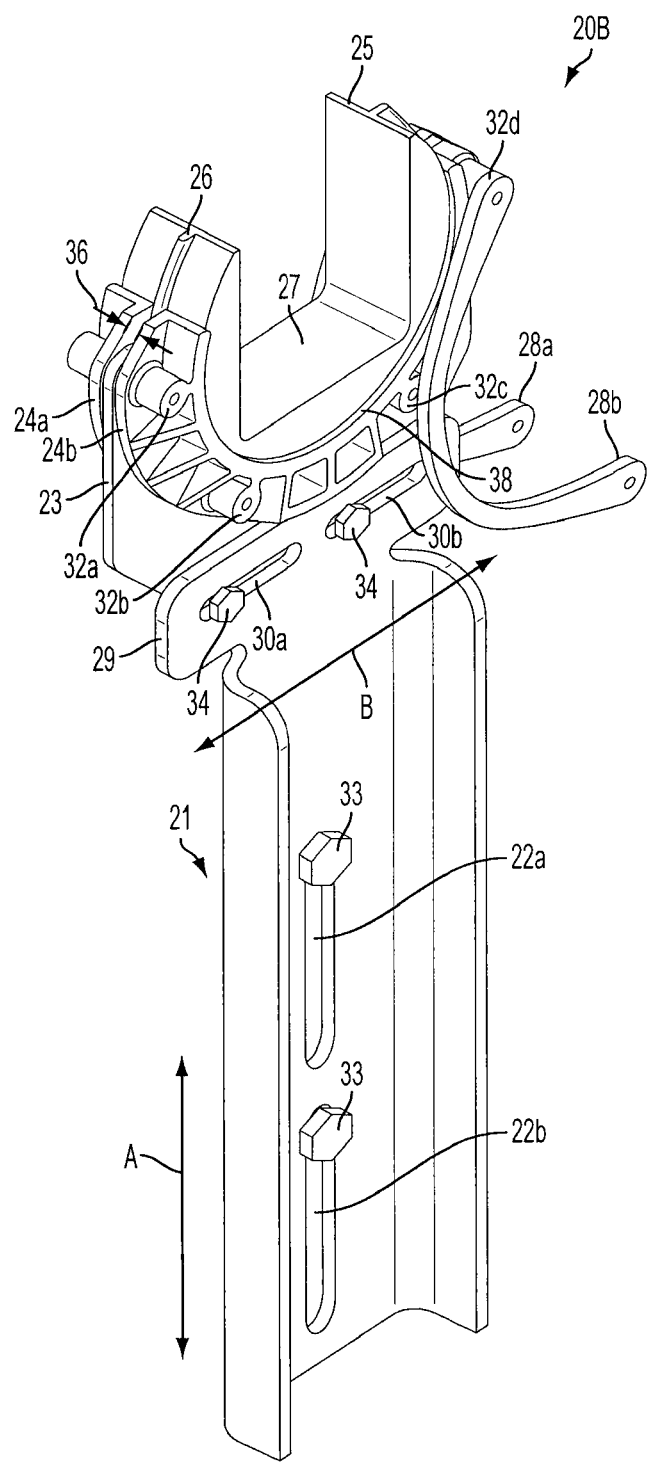
FIGS. 3A and 3B are perspective views of a solar tracker bearing, according to another exemplary embodiment, showing open and closed states.
Figure 3B:
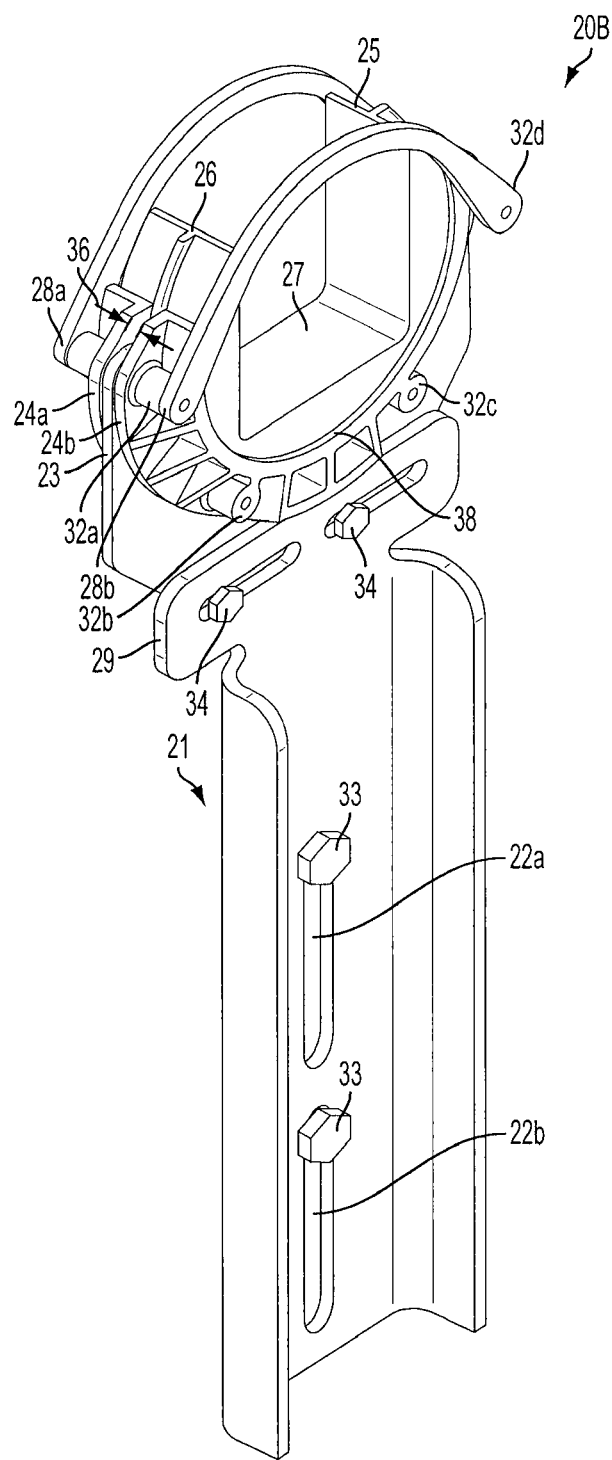

FIGS. 3A and 3B show a second embodiment of a solar tracker bearing, 20B, which separates the bearing securing element 21 from U-shaped bearing support element 23. In bearing 20B, bearing support element 23 is mountable to bearing securing element 21 at a pair of transversely adjustable mounting slots 30a and 30b on an upper flange 29 of bearing securing element 21. Bolts, screws, or other attachment means 34 may pass through the slots 30a, 30b and into or through holes in bearing support element 23 to secure bearing support element 23 to bearing securing element 21. This embodiment permits the transverse position of bearing 20B to be adjusted relative to support post 12 in the direction of arrow B.

Figure 6:
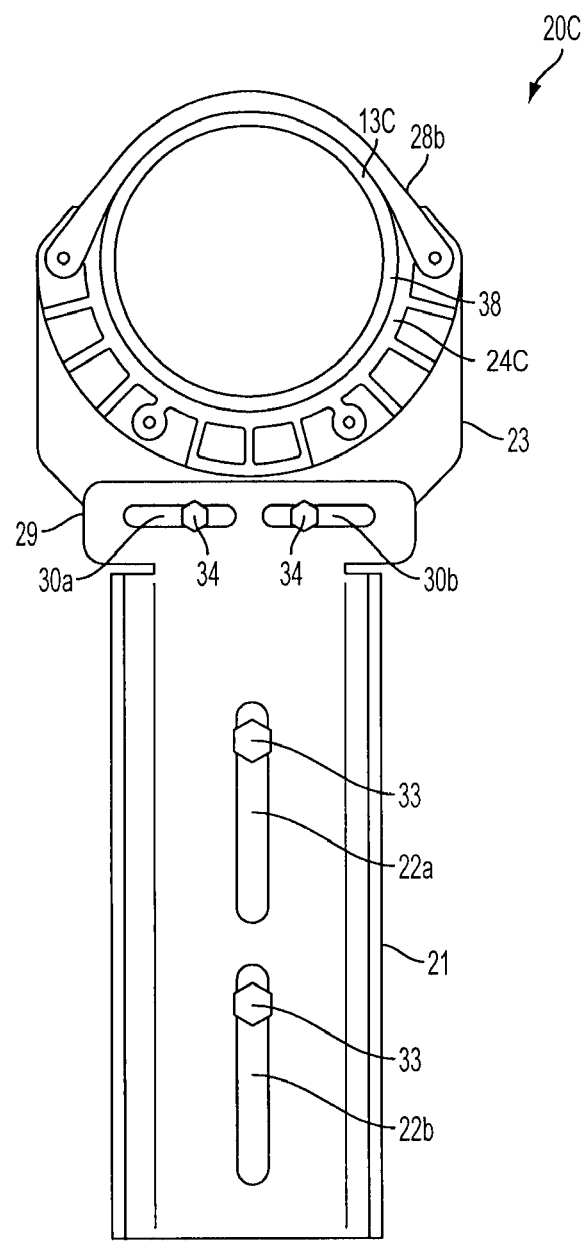
FIG. 6 is a side view of another exemplary embodiment of a solar tracker bearing.

FIG. 6 shows a third embodiment of a solar tracker bearing, 20C, which omits inner bearing race 25 and mounts a round torque tube 13C directly on surface 38 in a single outer bearing race 24C.

The bearing designs 20A, 20B and 20C shown in FIGS. 2A-2B, 3A-3B and 6 are all suitable for mass production and easy installation, as they have relatively few parts and allow a simple design for rotation of torque tube beams 13. This lowers the total cost of a solar tracker system 100 using bearings 20A, 20B or 20C, and reduces installation crew size.

While several embodiments have been described in detail, it should be readily understood that the invention is not limited to the disclosed embodiments. Rather the embodiments can be modified to incorporate any number of variations, alterations, substitutions or equivalent arrangements not heretofore described. Although certain features have been described with some embodiments of the carrier, such features can be employed in other embodiments of the carrier. While several embodiments have been described in detail, it should be readily understood that the invention is not limited to the disclosed embodiments. Rather the embodiments can be modified to incorporate any number of variations, alterations, substitutions or equivalent arrangements not heretofore described. Although certain features have been described with some embodiments of the carrier, such features can be employed in other embodiments of the carrier as well. Accordingly, the invention is not limited by the foregoing description, but is only limited by the scope of the appended claims.

What is claimed as new and desired to be protected by Letters Patent of the United States is:

1. A solar tracker bearing comprising:
   a pair of stationary outer bearing races attached on either side of a bearing support element;

a rotatable inner bearing race held by the pair of outer bearing races, the rotatable inner bearing race having a beam slot for seating a torque tube beam therein wherein the pair of outer bearing races are U-shaped and, wherein the U-shaped outer bearing races each comprise at least two arms and the arms of the U-shaped outer bearing races extend beyond 180 degrees to prevent the inner bearing race from being lifted out of the solar tracking bearing.

2. The solar tracker bearing of claim 1, wherein the beam slot is an open U-shaped beam slot.

3. The solar tracking bearing of claim 1, further including a bearing securing element for mounting the solar tracking bearing to a support post.

4. The solar tracking bearing of claim 3, wherein the bearing securing element comprises at least one mounting slot through which an attachment means can pass to mount the bearing securing element to the support post, the slot permitting adjustment of the height of the bearing securing element relative to the support post.

5. The solar tracking bearing of claim 3, wherein the bearing securing element is integrated with the bearing support element.

6. The solar tracking bearing of claim 3, wherein the bearing support element is mounted to the bearing securing element.

7. The solar tracking bearing of claim 6, wherein the bearing securing element has an upper flange with at least one mounting slot through which an attachment means can pass to mount the bearing support element to the bearing securing element, the mounting slot permitting adjustment of the position of the bearing support element relative to the bearing securing element.

8. The solar tracking bearing of claim 1, wherein the pair of outer bearing races are arranged to form a groove between them above a topmost part of the bearing support element, and the rotatable inner bearing race has a tongue to engage the groove.

9. The solar tracking bearing of claim 1, wherein the beam slot is configured to accept a torque tube beam having a square cross-sectional shape.

10. The solar tracking bearing of claim 1, wherein each of the pair of outer bearing races has at least one mounting slot through which an attachment means can pass to mount each outer bearing race to the bearing support element.

11. The solar tracking bearing of claim 1, wherein each of the pair of outer bearing races is individually detachable from the bearing support element.

12. The solar tracking bearing of claim 1, wherein the outer bearing races are formed of a low friction metal, polymer or bi-material metal-polymer hybrid.

13. The solar tracking bearing of claim 12, wherein the outer bearing races are formed of polyether ether ketone (PEEK), high-modulus polyethylene (HMPE), or polyoxymethylene (POM).

14. The solar tracking bearing of claim 1, wherein the inner bearing race is formed of stainless steel.

15. The solar tracking bearing of claim 1, further including at least one capture strap attached to one of the outer bearing races adapted to open or close the top of the solar tracking bearing.

16. The solar tracking bearing of claim 15, further including a pair of capture straps, one on each outer bearing race.

17. A solar tracker bearing comprising:
a pair of stationary outer bearing races attached on either side of a bearing support element;
a rotatable inner bearing race held by the pair of outer bearing races, the rotatable inner bearing race having a beam slot for seating a torque tube beam therein;
wherein the rotatable inner bearing race comprises:
an inner bearing race housing; and
a plurality of tube supports inside the inner bearing race housing.

18. The solar tracking bearing of claim 17, wherein at least one tube support of the plurality of tube supports comprises tabs that extend axially from the at least one tube support.

19. The solar tracking bearing of claim 17, wherein at least one tube support of the plurality of tube supports comprises an arcuate contour for contacting the torque tube beam.

20. A solar tracker bearing comprising:
a bearing support element;
a stationary U-shaped outer bearing race on a bearing securing element mounted to the bearing support element, wherein the U-shaped outer bearing race comprises at least two arms and the arms of the U-shaped outer bearing extend beyond 180 degrees, and the stationary U-shaped outer bearing race providing a bearing surface for seating a torque tube beam therein.

21. The solar tracking bearing of claim 20, further comprising a round torque tube beam that is operable to be seated directly on the bearing surface.

22. The solar tracker bearing of claim 20, further comprising a second stationary outer bearing race attached on the bearing securing element and providing a second bearing surface for seating the torque tube beam therein, wherein one of the outer bearing races is arranged on one side of the bearing securing element and the other of the outer bearing races is arranged on the other side of the bearing securing element.

23. A solar tracking system comprising:
at least one solar tracking bearing atop a support post, the solar tracking bearing comprising a pair of stationary outer bearing races attached on either side of a bearing support element, and a rotatable inner bearing race held by the pair of outer bearing races, the rotatable inner bearing race having an beam slot for seating a torque tube beam therein;
a torque tube beam seated in the beam slot;
a frame on which one or more photovoltaic modules are configured to be mounted, the frame being secured to the torque tube beam; and
an electromechanical actuator operable to control the inclination angle of the frame by causing the torque tube beam to rotate in the at least one solar tracking bearing;
wherein each of the pair of outer bearing races is individually detachable from the bearing support element;
wherein the pair of outer bearing races are U-shaped and, wherein the U-shaped outer bearing races each comprise at least two arms and the arms of the U-shaped outer bearing races extend beyond 180 degrees to prevent the inner bearing race from being lifted out of the solar tracking bearing.

24. The solar tracker system of claim 23, wherein the beam slot is a U-shaped beam slot.

25. The solar tracking system of claim 23, wherein the frame is secured to the torque tube beam by one or more brackets.

26. The solar tracking system of claim 23, wherein the electromechanical actuator is attached to the torque tube beam by a lever arm adapted to rotate the torque tube beam by extension or retraction of the electromechanical actuator.

27. The solar tracking system of claim 23, further including a bearing securing element for mounting the solar tracking bearing to the support post, the bearing securing element comprising at least one mounting slot through which an attachment means can pass to mount the bearing securing element to the support post, the slot permitting adjustment of the height of the bearing securing element relative to the support post.

28. The solar tracking system of claim 23, wherein the bearing securing element is integrated with the bearing support element.

29. The solar tracking system of claim 23, wherein the bearing support element is mounted to the bearing securing element.

30. The solar tracking system of claim 29, wherein the bearing securing element has an upper flange with at least one mounting slot through which an attachment means can pass to mount the bearing support element to the bearing securing element, the mounting slot permitting adjustment of the position of the bearing support element relative to the bearing securing element.

31. The solar tracking system of claim 23, wherein the pair of outer bearing races are arranged to form a groove between them above a topmost part of the bearing support element, and the rotatable inner bearing race has a tongue to engage the groove.

32. The solar tracking system of claim 23, wherein the beam slot is configured to accept a torque tube beam having a square cross-sectional shape.

33. The solar tracking system of claim 23, wherein each of the pair of outer bearing races has at least one mounting slot through which an attachment means can pass to mount each outer bearing race to the bearing support element.

34. The solar tracking system of claim 23, wherein each of the pair of outer bearing races is individually detachable from the bearing support element.

35. The solar tracking system of claim 23, wherein the outer bearing races are formed of a low friction metal, polymer or bi-material metal-polymer hybrid.

36. The solar tracking system of claim 35, wherein the outer bearing races are formed of polyether ether ketone (PEEK), high-modulus polyethylene (HMPE), or polyoxymethylene (POM).

37. The solar tracking system of claim 23, wherein the inner bearing race is formed of stainless steel.

38. The solar tracking system of claim 23, further including at least one capture strap attached to one of the outer bearing races adapted to open or close the top of the solar tracking bearing.

39. The solar tracking system of claim 23, further including a pair of capture straps, one on each outer bearing race.

* * * * *